US007965676B2

(12) United States Patent
Dimou et al.

(10) Patent No.: US 7,965,676 B2
(45) Date of Patent: Jun. 21, 2011

(54) METHOD AND APPARATUS FOR THE SYNCHRONISATION OF THE PHYSICAL LAYERS IN HETEROGENEOUS MOBILE COMMUNICATIONS NETWORKS

(75) Inventors: Konstantinos Dimou, Frankfurt am Main (DE); Eiko Seidel, Darmstadt (DE); Dragan Petrovic, Darmstadt (DE); Christian Wengerter, Kleinheubach (DE)

(73) Assignee: Panasonic Corporation, Osaka (JP)

(*) Notice: Subject to any disclaimer, the term of this patent is extended or adjusted under 35 U.S.C. 154(b) by 648 days.

(21) Appl. No.: 11/817,654

(22) PCT Filed: Jan. 20, 2006

(86) PCT No.: PCT/EP2006/000520
§ 371 (c)(1),
(2), (4) Date: May 28, 2008

(87) PCT Pub. No.: WO2006/094578
PCT Pub. Date: Sep. 14, 2006

(65) Prior Publication Data
US 2009/0122765 A1    May 14, 2009

(30) Foreign Application Priority Data
Mar. 4, 2005 (EP) .................................. 05004824

(51) Int. Cl.
*H04W 4/00* (2009.01)
(52) U.S. Cl. ......... 370/328; 370/338; 370/350; 455/436
(58) Field of Classification Search ........................ None
See application file for complete search history.

(56) References Cited

U.S. PATENT DOCUMENTS

| 2004/0185887 | A1  | 9/2004  | Wolman et al.           |
|--------------|-----|---------|-------------------------|
| 2004/0185899 | A1* | 9/2004  | Hayem et al. ... 455/552.1 |
| 2004/0203815 | A1* | 10/2004 | Shoemake et al. ... 455/450 |
| 2005/0135318 | A1* | 6/2005  | Walton et al. ... 370/338 |
| 2005/0250508 | A1* | 11/2005 | Guo et al. ... 455/452.1 |

(Continued)

FOREIGN PATENT DOCUMENTS
DE       10302228       8/2004
(Continued)

OTHER PUBLICATIONS

J. Sachs, et al. "A Generic Link Layer in a Beyond 3G Multi-Radio Access Architecture," Communications, Circuits and Systems, Jun. 2004, pp. 447-451.

(Continued)

*Primary Examiner* — Jayanti K Patel
*Assistant Examiner* — Anthony Sol
(74) *Attorney, Agent, or Firm* — Dickinson Wright PLLC

(57) ABSTRACT

The method according to the present invention provides synchronization in a heterogeneous mobile network, for the purpose of interoperability, of a wireless local area network, in which a medium is reserved for a certain service or user in radio channel reservation periods (702) of variable duration, to a radio access network, transmitting data in transmission time intervals of pre-defined duration (603). The variable duration of a radio channel reservation period (702) is defined such that it ends by a pre-defined time period (609) before the end of a transmission time interval (603). The method may be implemented in an access point (1400) of a heterogeneous network as well as in a mobile station (1500).

17 Claims, 14 Drawing Sheets

U.S. PATENT DOCUMENTS

2006/0148479 A1* 7/2006 Park et al. .................... 455/437
2006/0291483 A1* 12/2006 Sela ............................ 370/401
2007/0147315 A1* 6/2007 Khoury et al. ............... 370/338

FOREIGN PATENT DOCUMENTS

EP 1432263 6/2004

OTHER PUBLICATIONS

R. Sigle. "MRA Architecture, Mobile and Wireless Systems Beyond 3G," Wireless World Initiative-Ambient Networks, Feb. 2005, pp. 1-70.

PCT International Search Report dated Mar. 15, 2006.

* cited by examiner

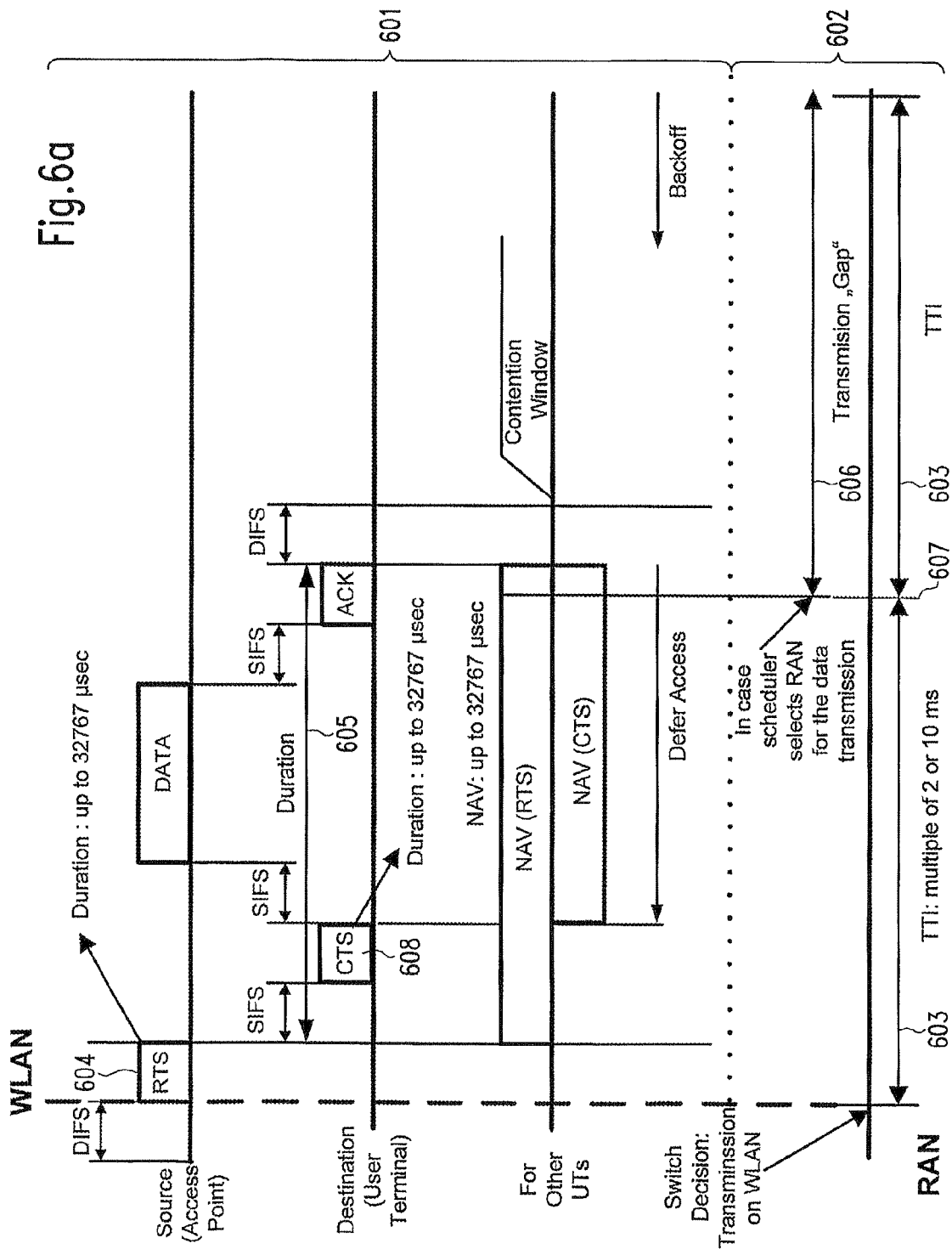

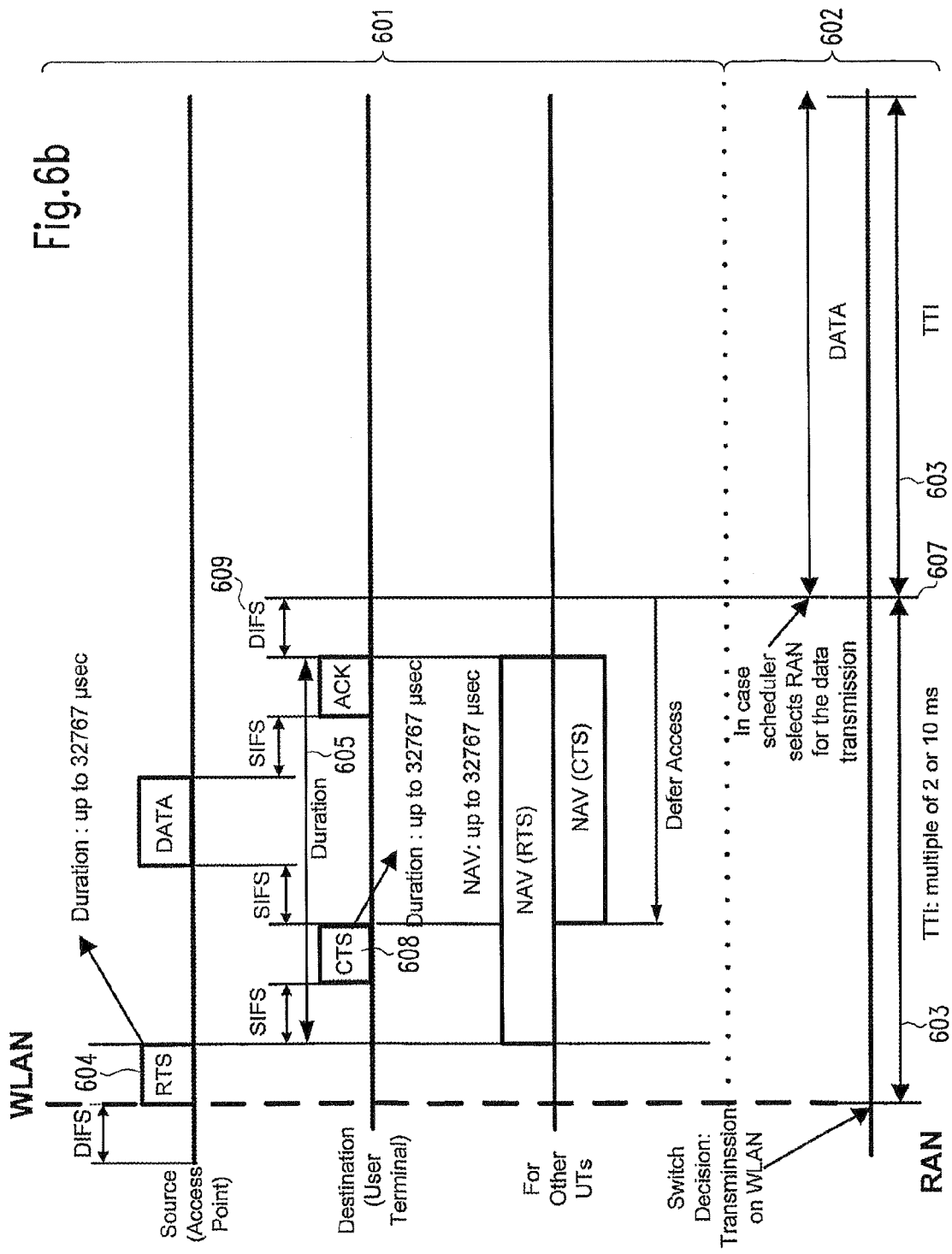

METHOD AND APPARATUS FOR THE SYNCHRONISATION OF THE PHYSICAL LAYERS IN HETEROGENEOUS MOBILE COMMUNICATIONS NETWORKS

BACKGROUND OF THE INVENTION

1. Field of the Invention

The present invention relates to wireless communication systems. More particular, it is related to synchronisation between the physical layers of a cellular wireless network and a wireless local area network in a heterogeneous network structure. Such synchronisation is essential for the efficient operation of a wireless communication infrastructure node, or device, that supports both of the above-mentioned systems.

2. Description of the Related Art

In packet services of cellular networks, like GSM/GPRS or UMTS, radio resources are usually administered in time intervals of pre-defined fixed length. For example in GPRS of GSM, packet channels are assigned in time units of time slots. With UMTS, data is transmitted on the physical channel in time units of transmission time intervals (TTIs). During one TTI, one so-called Transport Block Set is transferred by the physical layer on the radio interface. The TTI is always a multiple of the minimum interleaving period (e.g. 10 ms, the length of one RF (Radio Frame)). The MAC (Medium Access Control) delivers one Transport Block Set to the physical layer every TTI. Without loss of generality, UMTS terminology will be used for the description of the invention below. An extension to UMTS technology for high speed packet transmission is High Speed Downlink Packet Access (HSDPA). It allows packet-based data service in W-CDMA downlink with data transmission up to 20 Mbps. HSDPA implementations include Adaptive Modulation and Coding (AMC), Multiple-Input Multiple-Output (MIMO), Hybrid Automatic Request (HARQ), fast cell search, and advanced receiver design.

Among other applicable cellular RAN technologies there is CDMA2000 with the high speed packet transmission 1×EV-DV.

The TTI in UMTS is of fixed size; it can have values of 2, 10, 20, 40 and 80 ms. The TTI values cannot change very dynamically. Within a session, the TTI size can change from one of the above values to another value, but this involves signalling between the user terminal and the network. However, even if a change of the TTI value occurs, this implies that the TTI size changes from one value of the above-mentioned ones to another value of the group.

In addition, in UMTS there is a timing structure with numbering of frames and slots. In case UMTS cooperates tightly with another radio access technology, a radio access scheduler is needed. The radio access scheduler needs to have predefined operation intervals and a timing structure controlled by a clock or counter. For these reasons, it is fair to assume that, when UMTS is tightly cooperating with a wireless local area network the radio access scheduling period is going to be equal to a multiple M of UMTS TTIs.

$$RadioAccessSchedulingPeriod = M \times UMTS\_TTI \quad (1)$$

Moreover, a radio access scheduling period is assumed to start at the beginning of a TTI.

In wireless local area networks (WLANs), like for example according to the IEEE 802.11 protocol, air interface resources have to be reserved for transmitters or transmission links in order to avoid collision of different transmissions on the same channel. As such networks generally consist of a plurality of unsynchronized devices, there is no clock to which this reservation mechanism is synchronized, and the duration of the reservation can be made variable according to the instant requirements of the transmission. Without loss of generality, IEEE 802.11g terminology will be used for the description of the invention below.

The length of a period during which the channel is reserved in IEEE 802.11g can take any value between 0 and 32767 μsec. In addition, at the end of each channel reservation, an idle period follows. This period is called inter-frame space (IFS) and it can have different values, depending on the type of coordination within the WLAN Basic Service Set (BSS). In case of Distributed Coordination Function (DCF), this inter-frame is called DIFS (DCF inter-frame space). For the case of centralized control, hence the case of Point Coordination Function (PCF), this space is called PIFS (PCF inter-frame space). These inter-frame spaces have different values because the MAC uses these spaces in order to provide implicitly multiple priorities to users. Considering that PCF control is used for (near-) real traffic, hence for traffic of higher priority than packet data, the PIFS is smaller than the DIFS. Indeed the value of PIFS is equal to 25 μsec and the value of DIFS is equal to 34 μsec. Moreover, another type of IFS is defined: it is the Extended IFS (EIFS). It is the spacing required between the station's attempt to retransmit a failed packet and any previous frame sequence. Since retransmitted packets are of lower priority than the freshly transmitted ones, the value of EIFS is higher than the value of the previous IFS; it is equal to 43 μsec.

As the usage of wireless data transmission is constantly growing, the integration of different radio access technologies into heterogeneous networks becomes more and more important. For example a traveller in a car might have access to the internet from a notebook computer via a packet oriented service of a cellular network. Upon arrival in the office, IP traffic should be seamlessly handed over to a WLAN which is connected to the Internet via land line connections, e.g. glass fibres. In a boundary area there might even occur repeated handovers between both networks. Consequently there is a need for an efficient and seamless integration of different radio access technologies into heterogeneous wireless networks.

The coupling of different radio access technologies has been the subject-matter of various patent applications.

US-2004-0185887-A1 describes a Multi-Radio Unification Protocol (MUP). Implemented in a wireless node, it coordinates the use of multiple wireless network interface cards and provides a virtual layer that hides the multiple physical network interfaces from higher layers of a node's network protocol stack.

The issue of synchronizing the operation of different radio access technologies in multi-mode wireless communication devices and infrastructure nodes is described in US-2004-0185899-A1. More precisely, the synchronization of processors in different radio access technologies (RATs) is discussed. A case is considered, in which only one of the two systems is active at a time. Therefore the case of tight coupling is not addressed. Moreover, US-2004-0185899-A1 proposes a synchronization mechanism between two timers/counters by exchanging messages and interrupt signals. It would be desirable to avoid this exchange of signals.

The idea of using different RATs for the transmission of a single traffic flow is described in US-2004-0203815-A1. The combined use of licensed and unlicensed frequency bands and consequently systems is discussed and the functions and methods for the selection of the appropriate RAT during transmission are presented. However, as this document addresses radio selection at longer time scales, it does not address the case of tight coupling.

Even if solutions described in the prior art deal with the cooperation of different radio access technologies, the problem of transmission synchronization, or time alignment, at the physical layer is not addressed. For example, in the case of tight multi-radio cooperation, at each transmission time interval (TTI), data destined for one user may be scheduled on one of the two systems. The selection may be done on the basis of radio parameters (e.g. load), service QoS parameters, (e.g. round trip time), etc, as described in US-2004-0185887-A1. For the realization of the functionality mentioned above, and of other related functions, a multi-radio unification protocol is needed. This protocol is responsible for the selection of the RAT on which the transmission is performed. Therefore, a mechanism comprising a radio access scheduler is included in MUP. In addition, MUP is responsible for the multi-RAT automatic repeat request (ARQ). An exemplary protocol stack in the case of tight cooperation between a cellular RAN and a WLAN is displayed in FIG. 2.

In the tight cooperation between a WLAN and the RAN of a cellular system, the transmission in the physical layer looks like depicted in FIG. 3. Data is transmitted on one of the two systems. The radio access scheduler operates at certain time intervals, the radio access scheduling periods.

The timings of the physical layers are independent, if no action for their synchronization is taken. In this case, the operation of the multi-RAT scheduler is usually synchronized with the operation of the RAN physical layer, as it is shown in FIG. 4.

FIG. 6a shows an example of transmission in the physical layer, when a RAN 602 and a WLAN 601 tightly cooperate. The RAN uses transmission time intervals (TTI) of fixed length 603. In addition, the procedure of data transmission in the WLAN 601 is presented according to the IEEE 802.11 standard. Data transmission is initiated by the message Request to Send (RTS) 604. Among others, this message contains a field named "Duration". In this field, the transmitter specifies the time 605 for which it reserves the channel. This time is equal to the period needed for the data transmission plus the time required for the acknowledgement. The Duration field can have a value between 0 and 32767 μsec. If the duration value is not aligned with the TTI size in the RAN, then the end of transmission in the WLAN exceeds the boundaries of the RAN TTI and hence the WLAN is not available for the scheduling. This scenario is illustrated in FIG. 5.

In such a case, the scheduler has two options: either to allocate resources to users on the RAN, or to wait until the transmission in the WLAN ends and consequently the WLAN is free for scheduling as well. If the first option is chosen, the scheduler very likely allocates resources in contradiction to its policy. As an example, consider the case in FIG. 5 that at moment $t_2$ user D is allocated resources in WLAN, but these resources cannot be granted to him, because the WLAN is still occupied by user A.

If the second option is chosen, time gaps 606 in the transmission may occur, as shown in FIG. 6a.

In order to avoid time gaps in the physical layer transmission and to make feasible the operation of a multi-RAT scheduler, the two different physical layers have to be aligned in time. Consequently, there is a strong need for a mechanism in the MAC protocol of the WLAN that is providing this time alignment or synchronization.

As explained above, there is a need for time alignment of the physical layers of a cellular RAN and a WLAN in case of their tight coupling.

SUMMARY OF THE INVENTION

According to the basic principle of the present invention, the channel reservation period (including the IFS) during which a channel of the WLAN is reserved for a single user, ends in cases of tight coupling between a WLAN and a RAN with the expiration of a RAN TTI period. In order to make the WLAN channel available for the next radio access scheduling period, which starts with the beginning of a TTI, the Duration of a WLAN channel reservation period should fulfil the following rule:

$$t_n + \text{Duration} + \text{EIFS} = n \times \text{RAN\_TTI} \qquad (2)$$

Where $t_n$ is the instant of WLAN transmission start, n is any integer and RAN_TTI is the TTI length in RAN.

In one embodiment of the present invention, a method for synchronizing in a heterogeneous mobile network, for the purpose of interoperability, a wireless local area network, in which a medium is reserved for a certain service or user in radio channel reservation periods of variable duration, to a radio access network, transmitting data in transmission time intervals of pre-defined duration, comprises the steps of transmitting information from a protocol executing entity of the radio access network to a protocol executing entity of the wireless local area network, about a duration and a time alignment of the transmission time intervals; defining the variable duration of a radio channel reservation period such that it ends by a pre-defined time period before the end of a transmission time interval; and reserving the medium of the wireless local area network for the service or user, respectively, during the radio channel reservation period.

This method provides the advantage of seamless handover between the radio access technologies without costly additional hardware requirements.

In another embodiment of the present invention, a computer-readable storage medium has stored thereon instructions which, when executed on a processor of an access point of a wireless communication network or on a processor of a mobile station, cause the access point or mobile station to perform the method according to the present invention.

This provides the advantage of economic and flexible application of the invention. For example, existing hardware may be upgraded by software update.

In a further embodiment of the present invention, an access point of a heterogeneous wireless communication network, comprises wireless local area network communication means adapted to provide connection to a mobile station via a wireless local area network, which is adapted to reserve a medium for a certain service or user in radio channel reservation periods of variable duration; a radio access network interface for providing connection to said mobile station via a radio access network, wherein the radio access network transmits data in transmission time intervals of pre-defined duration; information transfer means configured to receive information from said radio access network about a duration and a time alignment of the transmission time intervals; and synchronising means configured to control the wireless local area network communication means such that the variable duration of a radio channel reservation period ends by a pre-defined time period before the end of a transmission time interval.

An access point according to this embodiment of the present invention provides optimum integration of different radio access technologies into one heterogeneous network. This way, optimum downlink connection is provided to a mobile phone under changing conditions of the transmission links.

In still a further embodiment of the present invention, a mobile station for a heterogeneous wireless communication network, comprises wireless local area network communication means adapted to provide connection to a heterogeneous wireless communication network via a wireless local area network, which is adapted to reserve a medium for a certain service or user in radio channel reservation periods of variable duration; radio access network connection means adapted to provide connection to said heterogeneous wireless communication network via a radio access network, wherein the radio access network transmits data in transmission time intervals of pre-defined duration; information transfer means configured to transfer, from said radio access network connection means to said wireless local area network communication means, information about a duration and a time alignment of the transmission time intervals; and synchronising means configured to control the wireless local area network communication means such that the variable duration of a radio channel reservation period ends by a pre-defined time period before the end of a transmission time interval.

The mobile station according to this embodiment provides optimum uplink connection under changing conditions of the transmission links.

BRIEF DESCRIPTION OF THE DRAWINGS

The accompanying drawings are incorporated and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein FIG. 1 demonstrates the operation of an infrastructure node supporting both cellular RAN and WLAN;

FIG. 6a illustrates the formation of transmission gaps in the physical layer transmission, if the RAN and the WLAN are tightly coupled without synchronization;

FIG. 6b illustrates how transmission gaps can be avoided;

DETAILED DESCRIPTION OF THE INVENTION

The illustrative embodiments of the present invention will be described with reference to the figure drawings wherein like elements and structures are indicated by like reference numbers.

Figure 1:
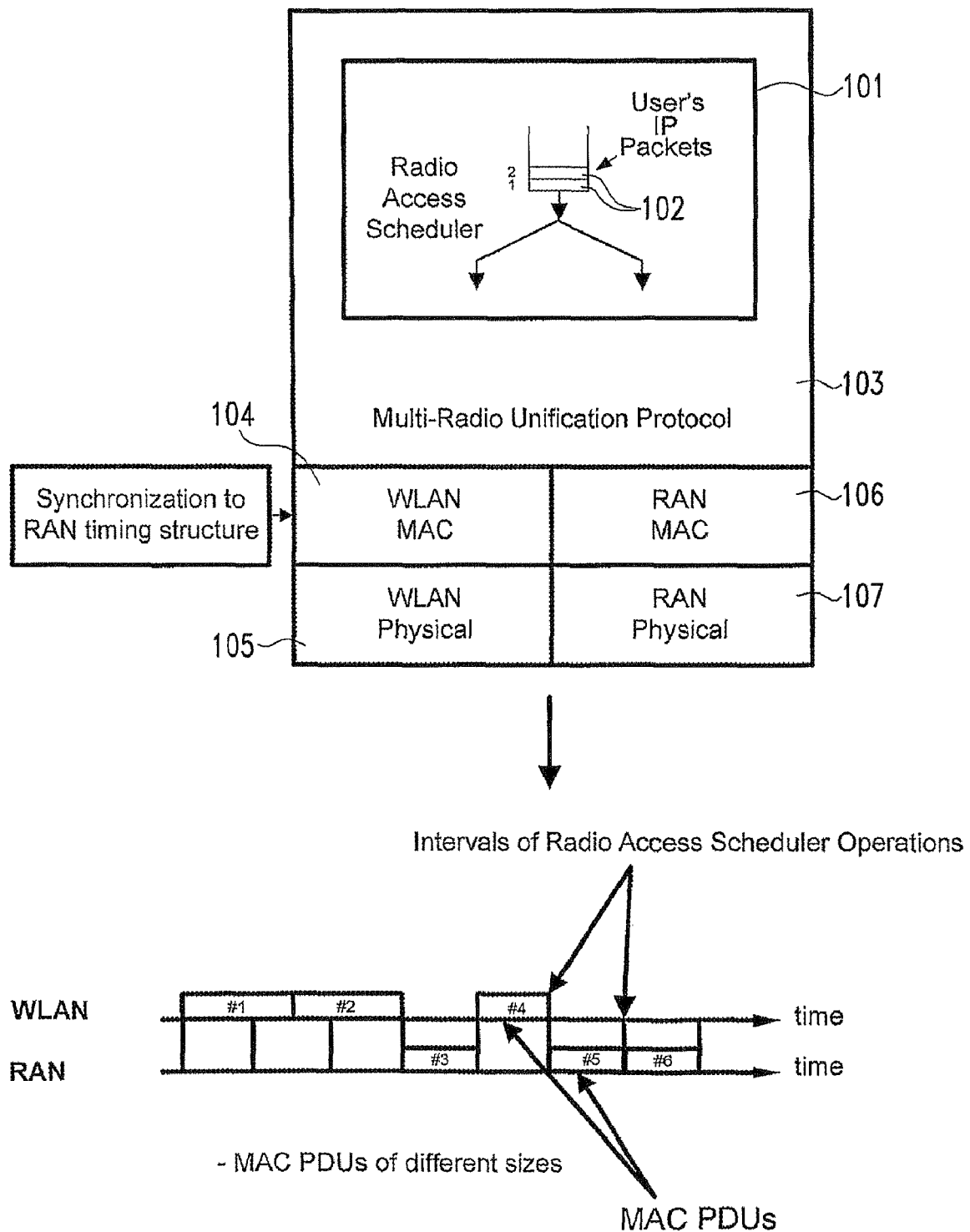

FIG. 1 demonstrates the operation of an infrastructure node supporting both cellular RAN and WLAN. IP packets 102 for a certain user may be transmitted using different radio access technologies. At least two radio access technologies are available, wherein one is a WLAN technology and the other is a radio access network having pre-defined transmission time intervals. The duration of the transmission time intervals is regarded as being constant within a certain time frame, although their duration might be switched between values comprised in a set of given values from time to time. In case of such a change of the TTI duration, the method described herein below would have to be re-initialised with the new TTI value.

The WLAN is symbolized in FIG. 1 by its MAC protocol layer 104 and the physical layer 105. The RAN comprises a MAC layer 106 and a physical layer 107. Other protocol layers may, and will in general, exist, but here only the entities involved in the packet transmission are shown. The two RATs are tightly coupled; hence, their radio resources are tightly managed. In addition some other joint control functions of the two systems are implemented. These functions are among others included in the multi-radio unification protocol 103, which enables the tight coupling of the different RATs.

Tight coupling enables a user to access both RATs throughout a session. At a given time instant, the user selects one of the two available RATs. As a result, the transmission can be done alternatively on different physical layers. Such a transmission is feasible if there is a buffer providing MAC Protocol Data Units (PDUs) of different sizes.

The selection of the RAT, through which the transmission is performed, is done at MUP level. In this layer, a RAT scheduler 101 exists. It receives measurement reports from underlay physical and MAC layers and it performs RAT scheduling on the basis of radio or other network parameters.

The scheduler 101 operates periodically at certain time instants, which are separated by the so-called radio access scheduling periods. The transmission on the physical layers of the RAN and the WLAN needs to be time aligned with the intervals of operation of the radio-access scheduler 101. In UMTS there is a mechanism of time synchronization; it can be time aligned with the timing of the radio access scheduler. In IEEE 802.11g, such a mechanism of timing synchronization does not exist and therefore it has to be incorporated therein by supplementary specifications, in cases IEEE 802.11g is tightly coupled with UMTS.

Figure 2:
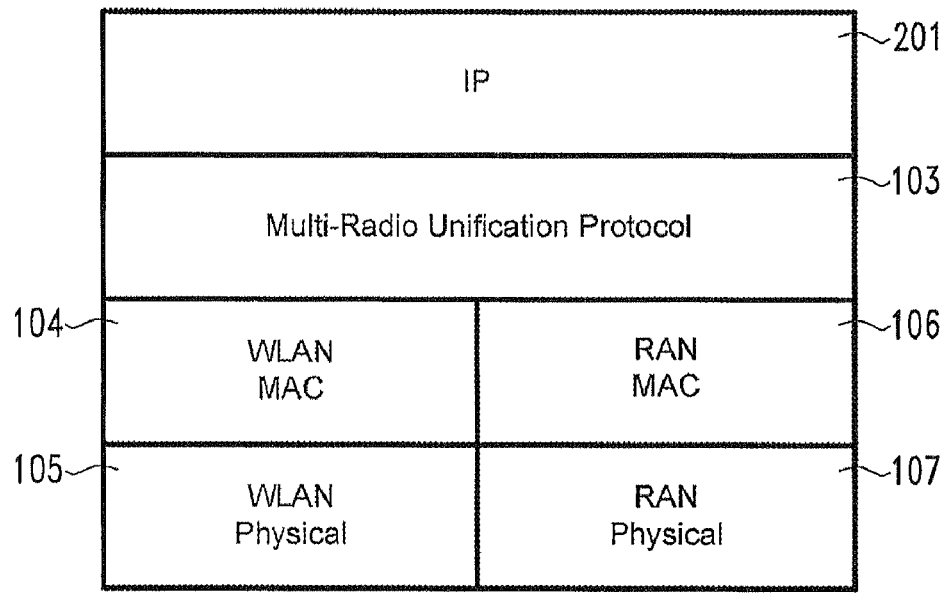
FIG. 2 shows the protocol stack of an infrastructure node that supports both cellular RAN and WLAN.

FIG. 2 shows the protocol stack of an infrastructure node or a mobile terminal that supports both cellular RAN and WLAN. The two radio access technologies are tightly coupled with the aid of the multi-radio unification protocol 103. On top of the physical and MAC layers of the two RATs, there is the MUP 103 which is responsible for the joint control of the underlay systems. In addition, it hides the heterogeneity of underlay RATs from IP layer 201, by providing a unified interface to it. The method according to the invention can be applied to both downlink and uplink. In the downlink case the method is carried out in an access point of the network and the uplink case the method is carried out in the mobile terminal, whereas the scheduling in most cases will be decided on the network side for both downlink and uplink.

Figure 3:
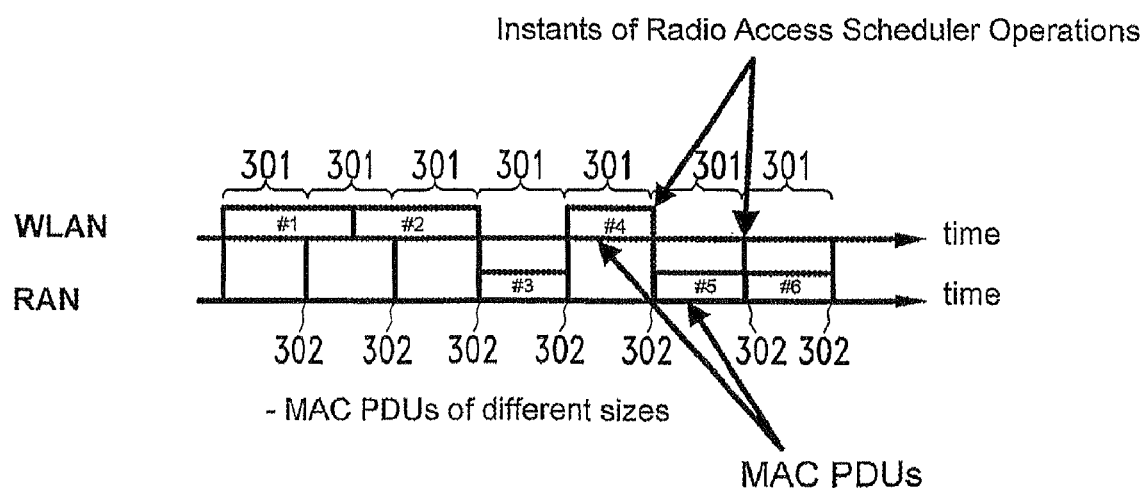
FIG. 3 illustrates the physical layer transmission over time in the case of tight coupling between RAN and WLAN.

FIG. 3 illustrates the physical layer transmission over time in the case of tight coupling between RAN and WLAN. It can be seen that the radio access scheduler operates periodically at certain time instances 302, separated by RAT scheduling periods 301. In addition, MAC PDUs #1 to #6 of different sizes are considered. In most cases, the scheduler will be synchronised with the RAN, such that the RAT scheduling periods are integer multiples of transmission time intervals.

Figure 4:
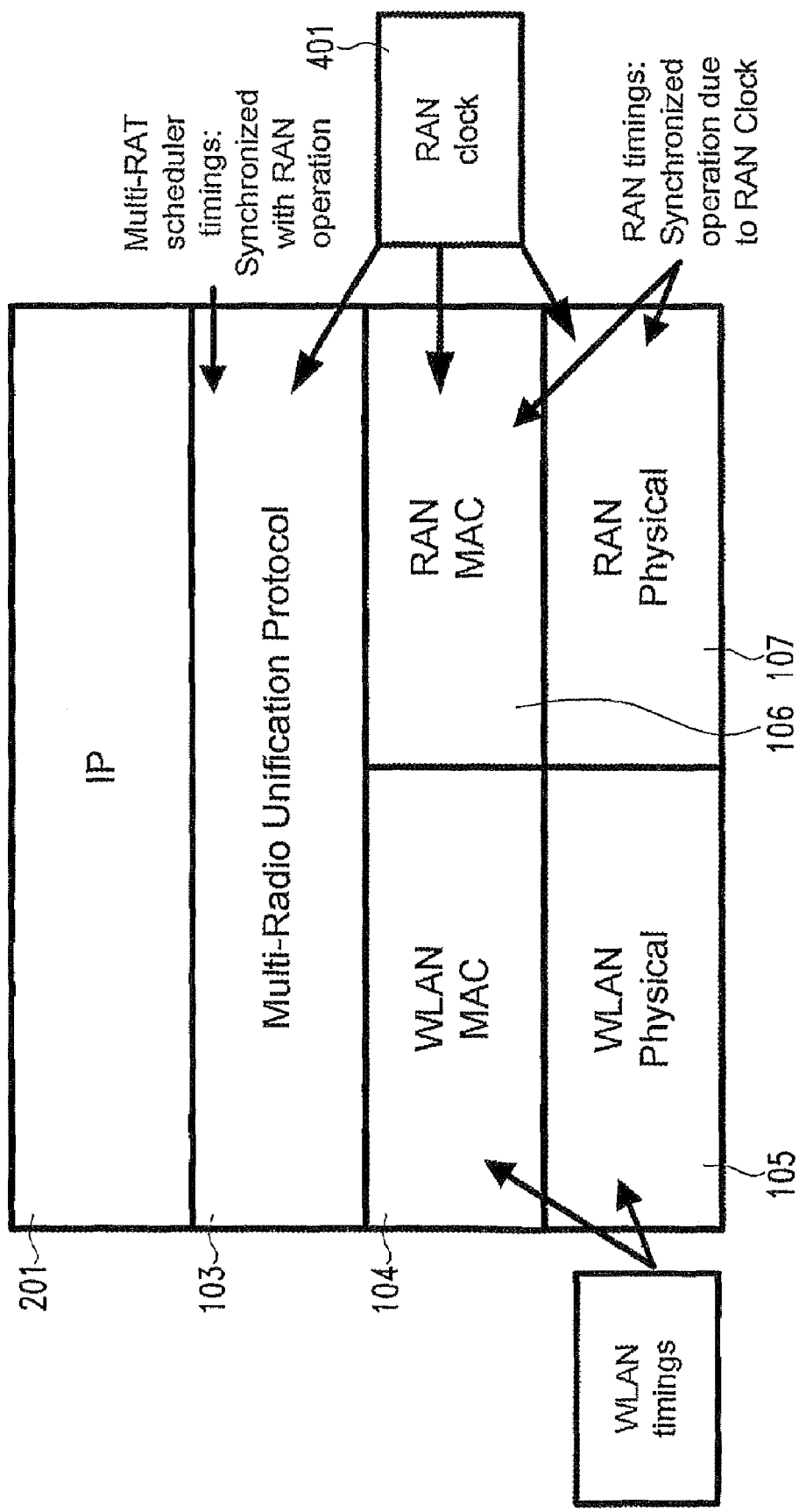
FIG. 4 presents the timings of RAN, WLAN and of the multi-RAT scheduler, in case of no alignment between RAN and WLAN.

FIG. 4 presents the timings of the RAN, the WLAN and of the multi-RAT scheduler, in the case that no alignment exists between RAN and WLAN. A clock 401 controls the timing of the RAN and protocol tasks are repeated periodically. In the WLAN, there is no similar timing and hence the timing of both radio access technologies is not coordinated. The multi-RAT scheduler 103 operates also at periodical time intervals and its operation is synchronized with the RAN timing.

Figure 5:
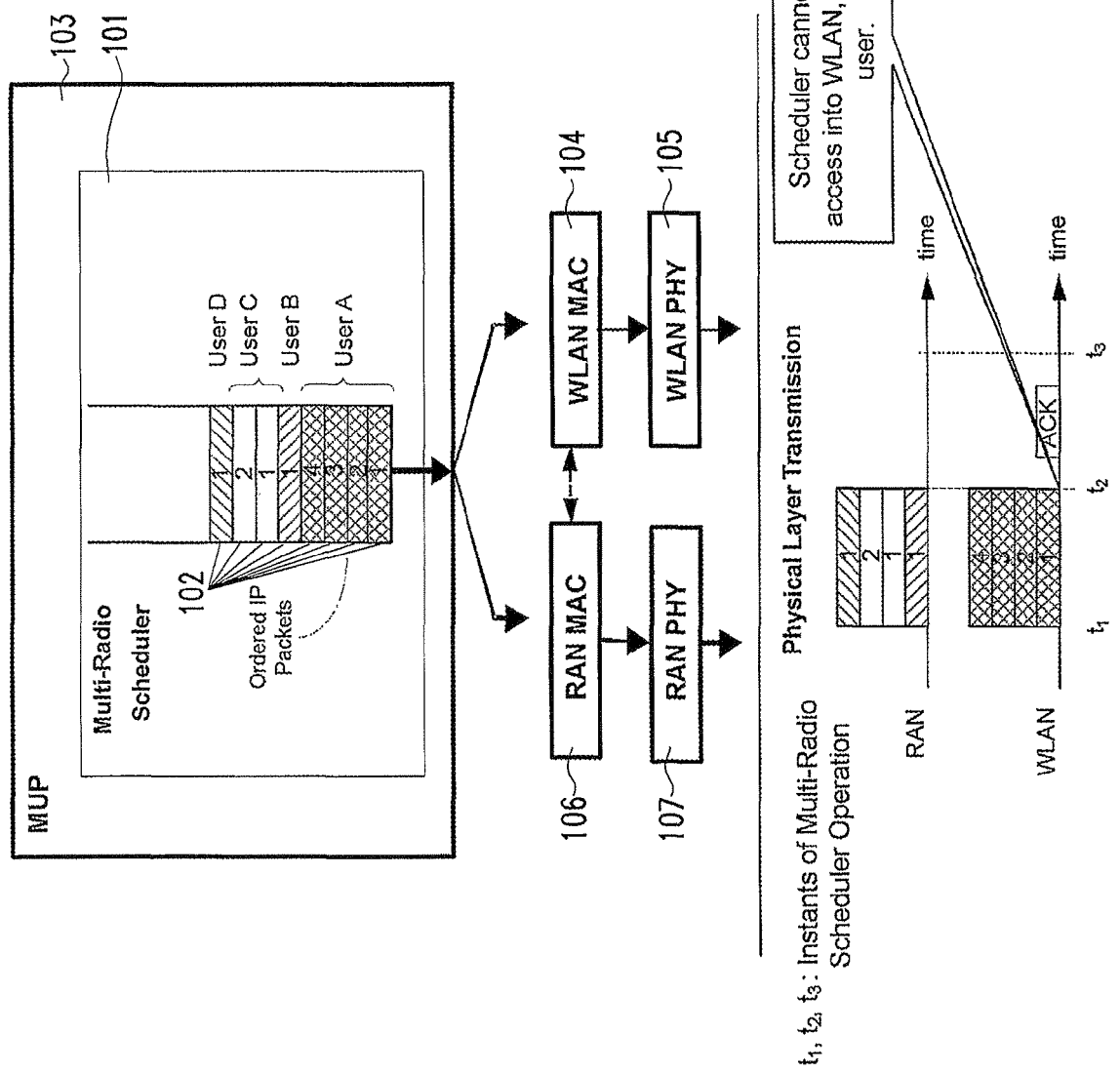
FIG. 5 presents a case in which the multi-RAT scheduler cannot allocate resources to the scheduled user in the WLAN, because this is still occupied by user A.

FIG. 5 presents a case in which the multi-RAT scheduler cannot allocate resources to the scheduled user in the WLAN, because this is still occupied by user A. In case of data transmission through the WLAN, the data transmission is done according to the procedure described in FIG. 6.

FIG. 6a illustrates the formation of transmission gaps 606 in the physical layer transmission, for the case of tight coupling between RAN and WLAN without synchronization of the two RATs. Such situations in which the multi-RAT scheduler cannot allocate resources to a user in the WLAN, because the it is still occupied, are very likely in absence of time alignment between the RAN and the WLAN. An RTS message 604 is sent from the transmitter to the receiver. Therein, the transmitter specifies the time period 605 in μsec during which it reserves the common channel. The field that specifies this reservation period is called "Duration" in the IEEE 802.11g protocol. Upon reception of this message, all the stations in the same BSS update their Network Allocation Vector (NAV) and they refrain from accessing the channel during the reservation period 605. The CTS message 608 also contains a duration value, which is calculated from the original duration in a way that both durations end at the same time instant. If the value for the duration is not selected properly, a time gap 606 in the physical layer transmission might occur. This happens when the occupation of the channel in the WLAN finishes after the moment of operation 607 of the radio-access scheduler and for any reason, e.g. radio channel conditions, the transmission cannot continue in the WLAN. In this case no data can be transmitted for the respective user or service at all during the transmission gap 606, as the time for scheduling data on the RAN has been missed and the WLAN channel is not usable due to these special conditions.

This situation can be avoided by adapting the duration of the WLAN radio channel reservation period as shown in FIG. 6b. The duration 605 is calculated such that it ends before the start of the inter-frame space 609. In other words, the duration of the radio channel reservation period ends by the pre-defined time period IFS before the end of the RAN transmission interval. In the case of a scheduler decision to transmit data on the RAN from that time instant on, this data transmission can start with the beginning of the next TTI. Therefore data transmission is handed over seamlessly from the WLAN to the RAN.

In FIG. 6 time relationships between "RTS", "CTS" and "ACK" and inter-frame space on one side and data transmission on the other side are exaggerated for the sake of clarity. In reality, most of the transmission time will be available for data transmission.

Figure 7:
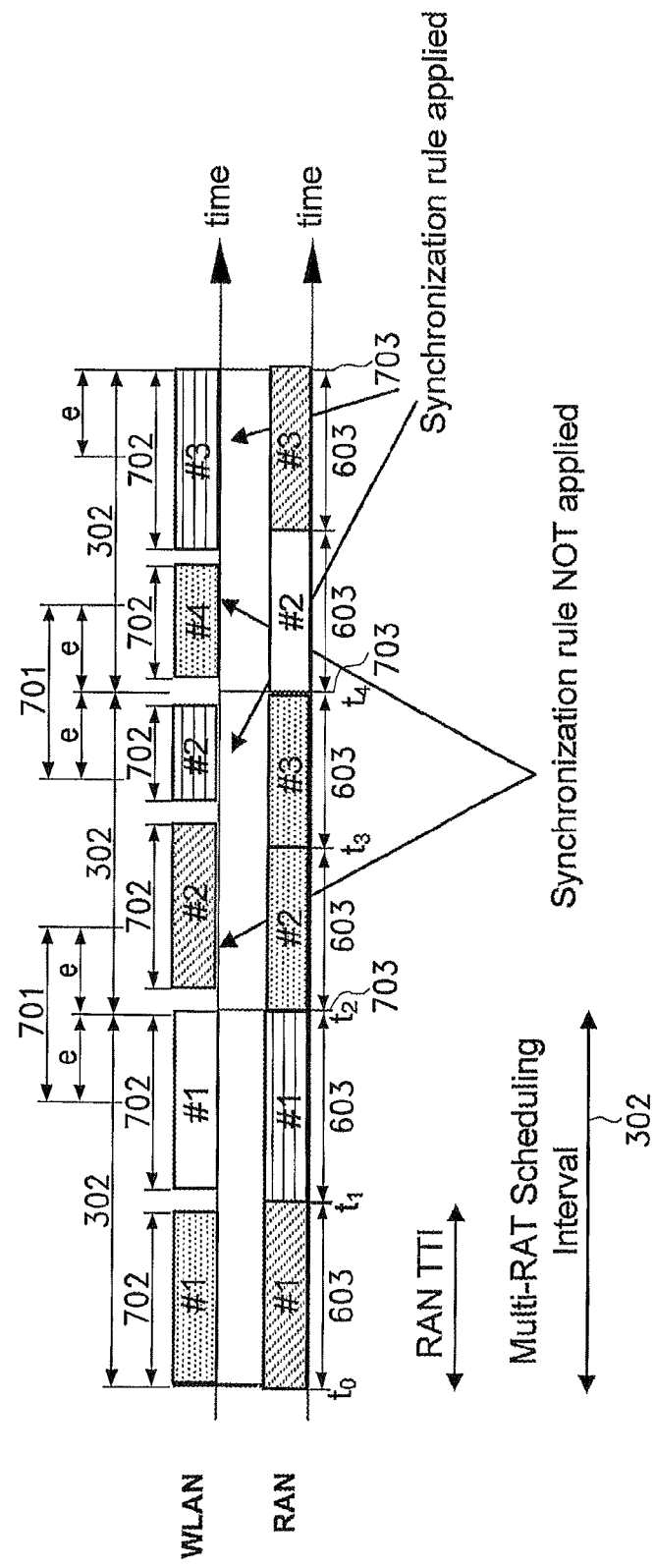
FIG. 7 displays an example in which the duration rule is applied to a part of the WLAN channel reservation periods.

FIG. 7 displays an example in which the duration rule is applied to a part of the WLAN channel reservation periods. Rule (2) is applied for transmissions in the WLAN which occur at moments close to the end of a radio access scheduling period. In the illustrative example presented therein, the multi-RAT scheduling interval 302 is twice the UMTS TTI size. At each multi-RAT scheduling interval, the scheduler 101 decides which users are allocated to which RAT and for which period of the time (until the next multi-RAT interval). E.g., the moment $t_4$ the scheduler decides to grant resources to users B and D to IEEE 802.11g and to give grant to users C and A to UMTS. The transmission of user B through IEEE 802.11g finishing far from the next multi-RAT scheduler boundary, the time alignment rule is not applied. For the transmission of user D through IEEE 802.11g however the time alignment rule is followed, since the end of this transmission is close to the multi-RAT scheduling instant.

To determine the "closeness" of the transmission to the scheduling instant 703, a time distance limit e 704 may be defined. For each radio channel reservation period 702 at first an estimated duration is calculated according to the rules of the WLAN specification. A transmission is then regarded as being close to a scheduling instant 703, if it would end with the estimated duration within a time window 701 of ±e around the scheduling instant 703 which is the end and beginning of the respective multi-RAT scheduler intervals 302.

This implies that information about the timing in the RAN is available to the MAC protocol of the WLAN. It requires information flow from the RAN clock to the MAC protocol of the WLAN which can be achieved by the transmission of respective messages. This does not mean that a clock/timer in the WLAN should be synchronized with its peer in the RAN. The approach here is to avoid this synchronization mechanism by simply sending information on the RAN TTI and on the RAN clock/counter to IEEE 802.11g. This information is transmitted upon any change either of the RAN TTI size, or of the RAN clock.

The MAC protocol needs to be aware of the fact that it is tightly coupled with the RAN, since it is notified on that. This notification may come in the form of a primitive to the MAC Layer Management Entity (MLME).

Figure 8:
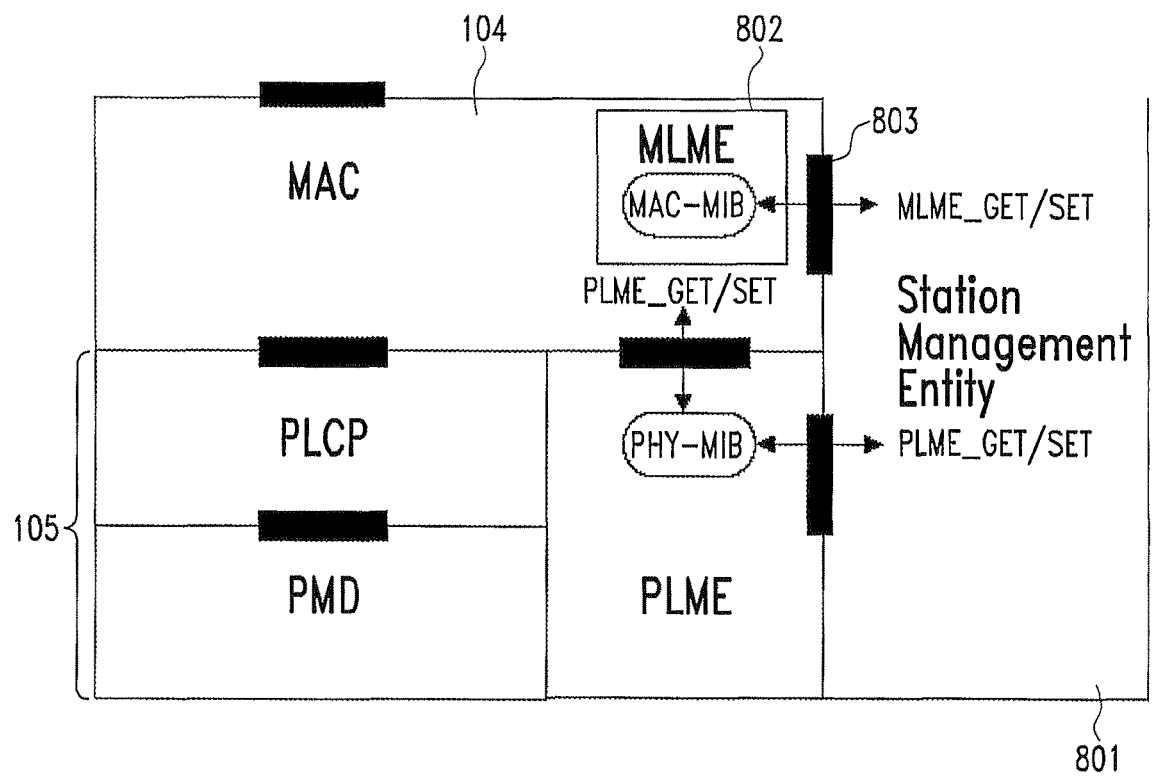
FIG. 8 shows the protocol stack in IEEE 802.11 systems, along with the management entities of MAC and physical layers and the station management entity.

FIG. 8 shows as an example the protocol stack in IEEE 802.11 systems, along with the management entities of MAC 104 and physical layers 105 and the station management entity 801. In other WLAN protocols equivalents for the described entities will exist. Between the MAC management entity (MLME) 802 which is part of the MAC layer 104, and the Station Management Entity 801 (SME), there is a SAP 803, through which primitives are exchanged. One of these primitives is the MLME-START.request. It is sent from the MLME entity 802 to the MAC entity 104, in order to request the beginning of a BSS (Basic Service Set). Hence it can be used to initiate the operation of a MAC entity within an AP. A field may be added to this primitive, called "Cooperation with Other RA", of size equal to 1 bit (with values 0 and 1). If the value of this field is equal to 1, then a newly proposed primitive MLME-TIME_ALIGN.request is sent from the MLME entity 802 to the MAC entity 104. It contains fields named "Other RAT Types", "Other RAT TTI Sizes" and "Other RAT Timing Information". The field "Other RAT Types" contains the type of RAT with which cooperation is performed. The field "Other RAT TTI Sizes" contains the TTI sizes (in ms) in the other RAs, e.g. UMTS. The field "Other RAT Timing Information" contains information about a start time of a TTI.

Such a time alignment is essential for any case of multi-radio cooperation in uplink. Hence, in case of uplink, the additional field could be named "Cooperation with Other RA".

Currently, the SME is out of scope of 802.11 specifications. Hence, SME is implemented by each vendor individually, either as a driver software, or as an API. In case of tight coupling, the SME may communicate with the entity that performs the joined management of radio resources. Hence this information is provided to the SME in this case by the entity that jointly manages the radio resources.

Figure 9:
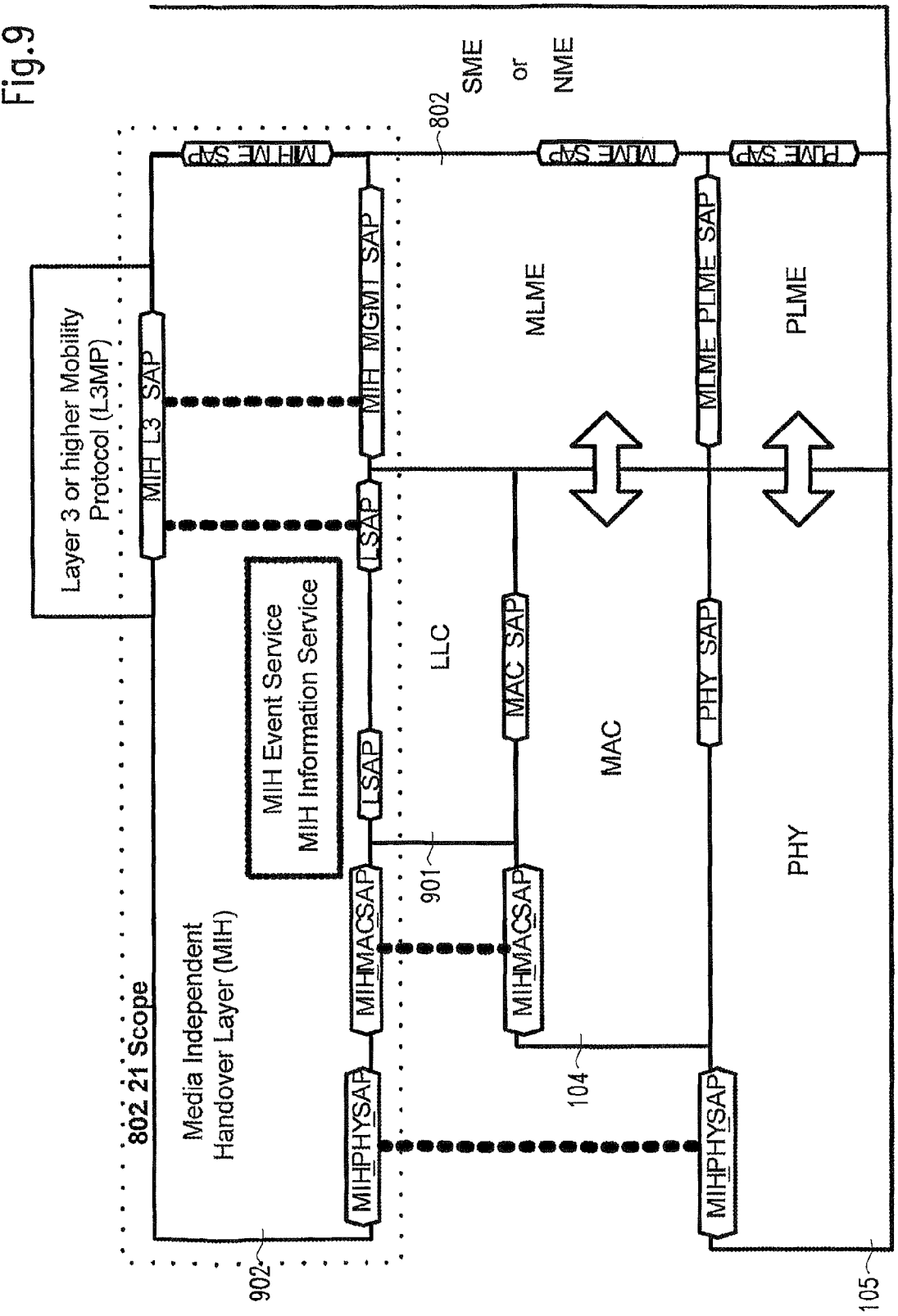
FIG. 9 shows the media independent handover (MIH) reference model according to IEEE 802.21.
Figure 10:
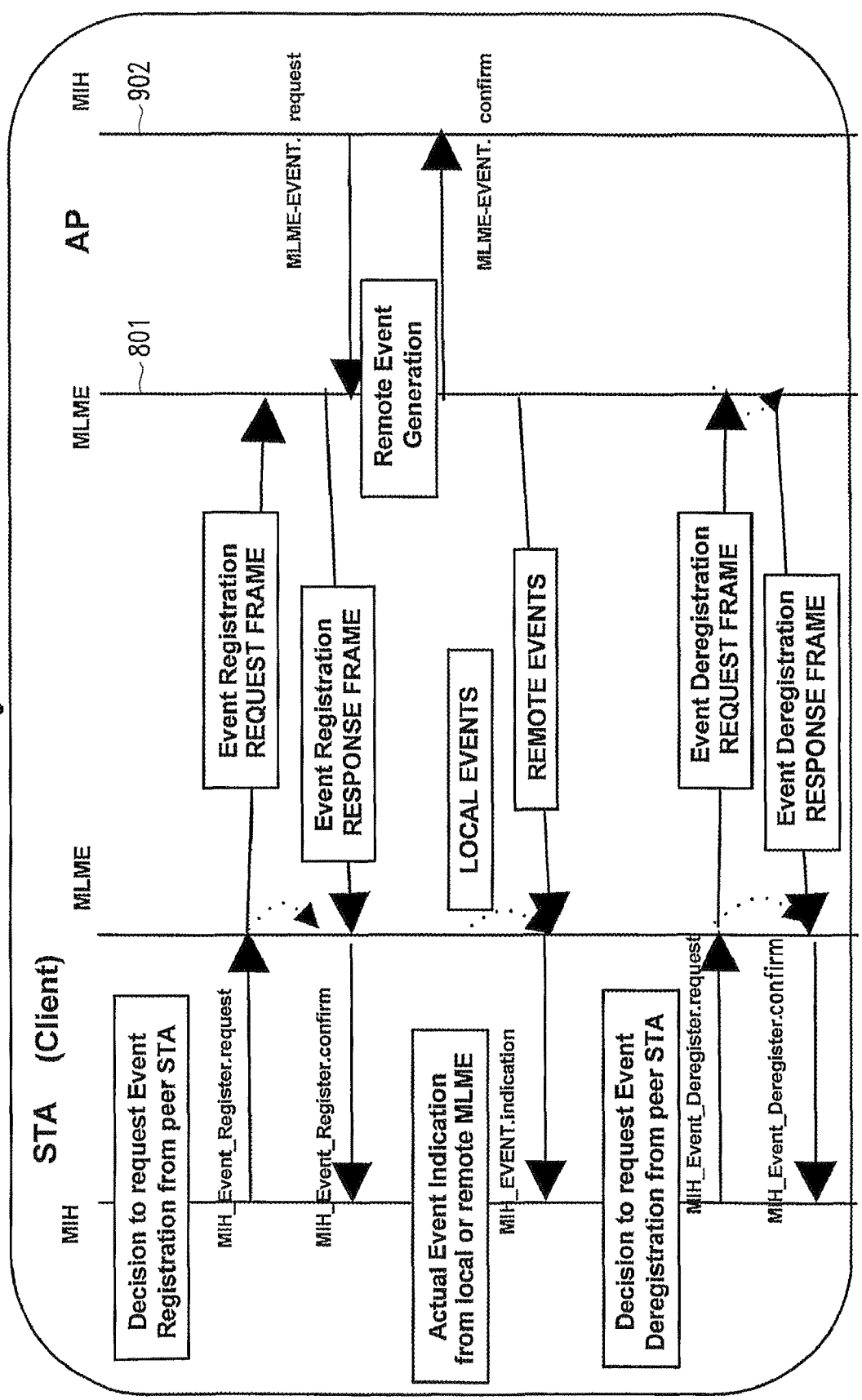
FIG. 10 shows the event flow model according to IEC 811.21.

The IEEE 802.21 protocol is advantageous for the implementation of the method according to the invention. FIG. 9 shows the media independent handover (MIH) reference model according to IEEE 802.21. It also shows the SAP 901 between MIH layer 902 and MAC 104 through which the primitive proposed below is transmitted. In case of IEEE 802.21 enabled AP, the latter receives information on the link quality of the mobile stations (STA) within its base station subsystem (BSS). Changes in the link of a certain STA are notified to the MIH layer of the STA through MIH_PHY_SAP. The MIH layer 902 communicates with the MLME entity 802 (FIG. 9). The MLME entity of the STA transmits information about different events to its peer entity in the AP, as it can be seen in FIG. 10. One of the events that can be notified to the MIH layer is the degradation of the link quality. A change in the link quality is notified to the MIH layer with the aid of MLME-EVENT.confirm primitive. In this case, the event id field of the primitive is "Link_Going_Down" with the additional fields (among others) MAC address of the STA, "MAC Address", and the time interval after which the link is expected to go down, "TimeInterval". Upon reception of this message at AP side, the MIH layer may send a newly defined primitive called "MIH_MAC_TimeAlign.request" in order to indicate to the MAC (IEEE 802.11) that the time alignment rule should be applied. The proposed primitive contains three fields:

Activate,
STA_MAC_Address,
Time_Interval

The field "Activate" consists of a single bit. It indicates whether the time alignment rule has to be activated or deactivated. The field "STA_MAC_Address" contains the MAC Address of the STA, which reported this event to the AP. The field "Time_Interval" indicates the time interval until the moment at which the link for this specific STA is expected to go down (as this moment is indicated in the respective "TimeInterval" field of the "MLME-EVENT.confirm" primitive). Upon reception of this primitive, MAC applies this time alignment rule for allocations that are close to the time bound specified by the "Time_Interval" field for the STA with the address specified by the field "STA_MAC_Address".

The proposed primitive can also be applied for the case that the link is not finally going down, as it was previously predicted. In this case, the STA notifies the AP. The MIH entity of the AP receives this notification with the aid of the "MLME-EVENT.confirm" primitive. The event ID of the primitive is "Link Event Rollback". Upon reception of the primitive with this event ID, the MIH entity may inform the underlay MAC that the expected degradation of the link is not finally taking place. Therefore, the MIH may transmit the primitive "MIH_MAC_TimeAlign.request" with the field Activate equal to 0 in this case. The primitive field "STA_MAC_Address" contains the MAC Address of the STA for which the time alignment should not be activated, and the field "TimeInterval" is empty (or equal to 0) in this case.

Figure 11:
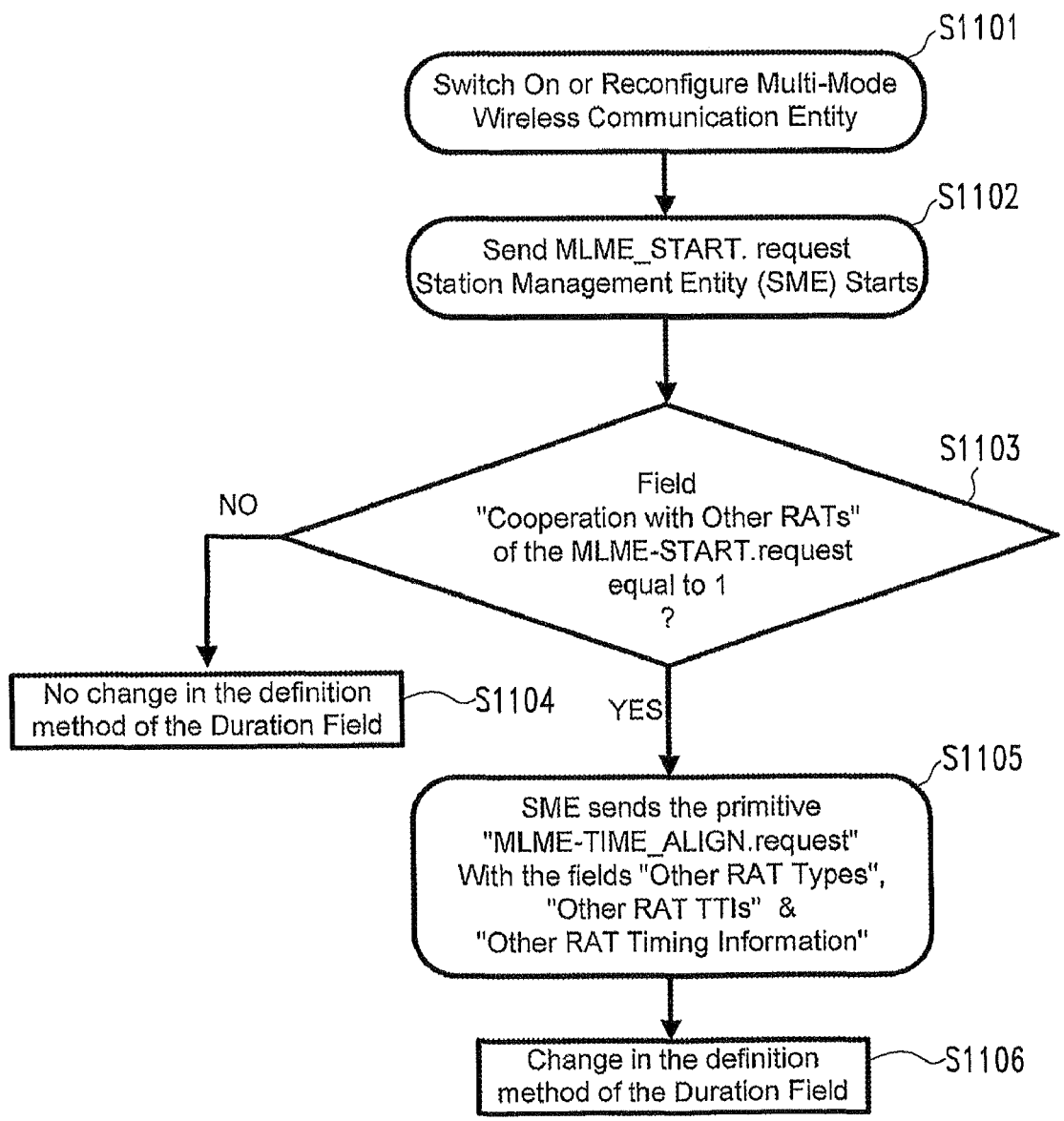
FIG. 11 shows a flow chart for start-up and reconfiguration of the AP and for change of the RAN TTI size.

FIG. 11 shows a flow chart for start-up and reconfiguration of the AP and for change of the RAN TTI size. In Step S1101 the process is started either by the start-up of the system or by a reconfiguration command. As a consequence, the station management entity starts operation in step S1102. Step S1103 checks whether synchronisation with other radio access technologies is requested by the SME. If the respective flag in the "MLME-START.request" primitive is 0, the procedure ends in step S1104 without changing the definition method for the duration of the channel reservation period. If the flag is 1, another primitive called "MLME-TIME_ALIGN.request" is received by the MLME from the SME in step S1105. The MLME changes the definition method for the duration of the channel reservation period in accordance with equation (2) by controlling the MAC layer accordingly in step S1106.

Figure 12:
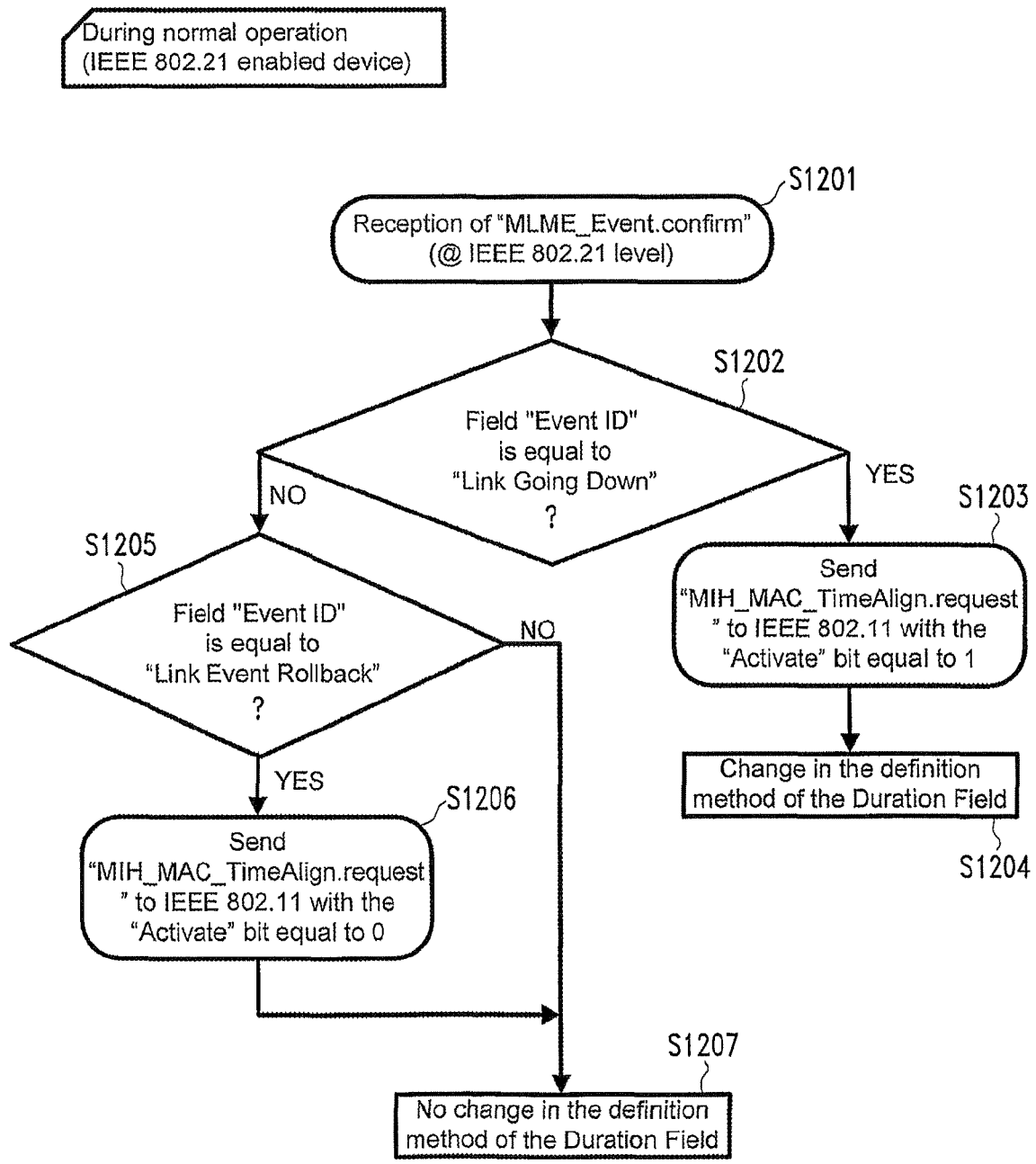
FIG. 12 shows a flow chart for the case of an event notification in an MIH-enabled AP.

FIG. 12 shows a flow chart for the case of an event notification in an MIH-enabled AP (IEEE 802.21). In step S1201 the MIH entity receives a "MLME_EVENT.confirm" primitive from the MLME, which is examined for its content in step S1202. If the field "Event ID" equals "Link Going Down", a handover between the different radio access technologies has to be expected. Consequently the MIH entity sends in step S1203 a primitive "MIH_MAC_TimeAlign.request" to the MLME with the "Activate" bit set to 1, which causes a change in the definition method for the duration of the channel reservation period, according to equation (2), in step S1204. Referring back to step S1202, if the field "Event ID" is different from "Link Going Down", it is next checked in S1205 whether this field equals "Link Event Rollback". In this case the handover is not necessary anymore, and synchronisation is de-activated by sending a primitive "MIH_MAC_TimeAlign.request" to the MLME with the "Activate" bit set to 0. After this, the synchronisation remains de-activated until a new "Link Going Down" message is received. If in step S1205 the field "Event ID" is different from "Link Event Rollback", the procedure proceeds to S1207 to leave the method of defining the duration of the channel reservation period unchanged.

Figure 13:
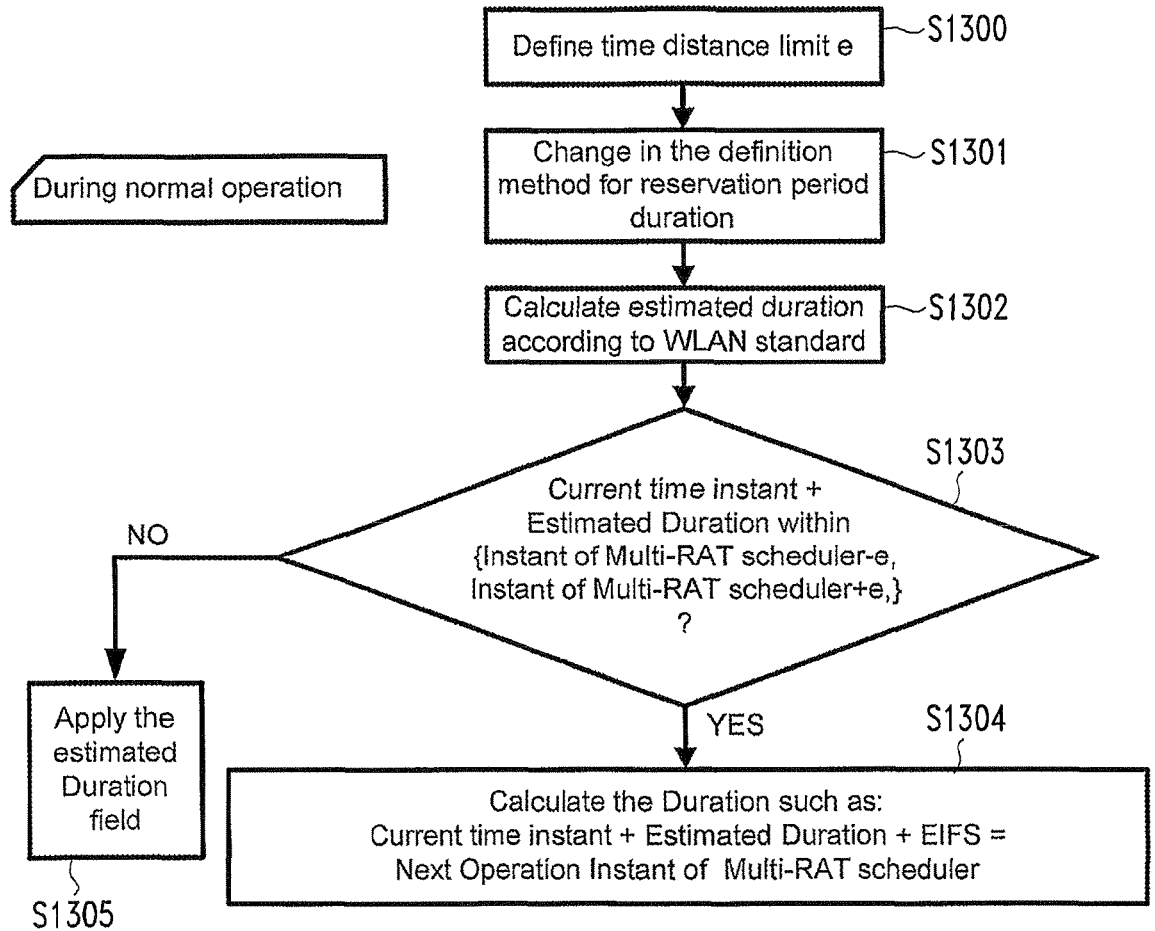
FIG. 13 shows a flow chart for the time alignment procedure.

FIG. 13 shows a flow chart for the time alignment procedure. In step S1300 a time distance limit e is defined. This may be done by simply reading a constant from a memory location or by calculation depending on other parameters like the length of the multi-RAT scheduling period or the types of radio access technologies involved. Thereafter, when the MLME receives a message in step S1301 indicating a change in the definition of the radio channel reservation period duration, such that synchronization with a RAN of another radio access technology should be obtained, firstly an estimated duration of the next radio channel reservation period is calculated in step S1302 using the definition according to the WLAN standard. In step S1303 it is checked, whether the next radio channel reservation period having the estimated duration would end within a time window of ±e around the next multi-radio access technology scheduler instant. This instant is identical to the beginning of the next multi-RAT scheduling period. e denotes a time distance limit around this scheduling instant. If it is determined in step S1303 that the next radio channel reservation period with the estimated duration would end within the time window of ±e around the next multi-radio access technology scheduler instant, the duration is re-calculated in S1304 as described above in connection with equation (2). If the estimated end of the next radio channel reservation period is determined to be outside the time window, the estimated duration is applied unchanged. In the case of IEEE802.11g, the duration value is inserted into the "duration" field of the Request to Send (RTS) message.

In order to be able to interpret the timing information indicating the start time of a RAN TTI, the entity (AP) executing the WLAN protocol has also information about the time scale of the RAN.

To this end, UMTS/HSDPA (or any synchronized RAN) transmits its current time to the IEEE 802.11 (or to any kind of WLAN) protocol executing entity. If RAN and WLAN are co-located in the same physical component, the delay of transmission of this information from the RAN protocol stack to the WLAN protocol can be constant and of known value.

In case the two RATs are not co-located, the connection between them can have a constant delay value in certain cases, e.g., SONETs (synchronized optical networks) can offer constant delay values between two points. In the case of constant delay, the UMTS Node B can transmit to the AP the information that the TTI (or multi-RAT scheduler interval)

changes and starts at a moment "t_now+time_hysteresis" where the value "time_hysteresis" is longer than the constant delay of transmission between the UMTS Node and the AP.

It is supposed in both cases, that the constant delay value is known to both of the entities beforehand.

Alternatively, the AP may obtain time information from the radio interface of the RAN. To this end, it may comprise a unit receiving synchronisation and/or broadcast channels of the RAN in which information about the system clock is contained.

Another alternative obtains information about the RAN timing related to the WLAN time scale via a mobile station. This mobile station may be any mobile station in communication with the AP or it may be the particular mobile station for which the data is transmitted in the reservation periods in question. The mobile station may deliver to the AP information about the TTI timing obtained from its RAN protocol stack or it may just deliver information about the RAN system time, in cases where the TTI timing information is transmitted over a wired network.

Figure 14:
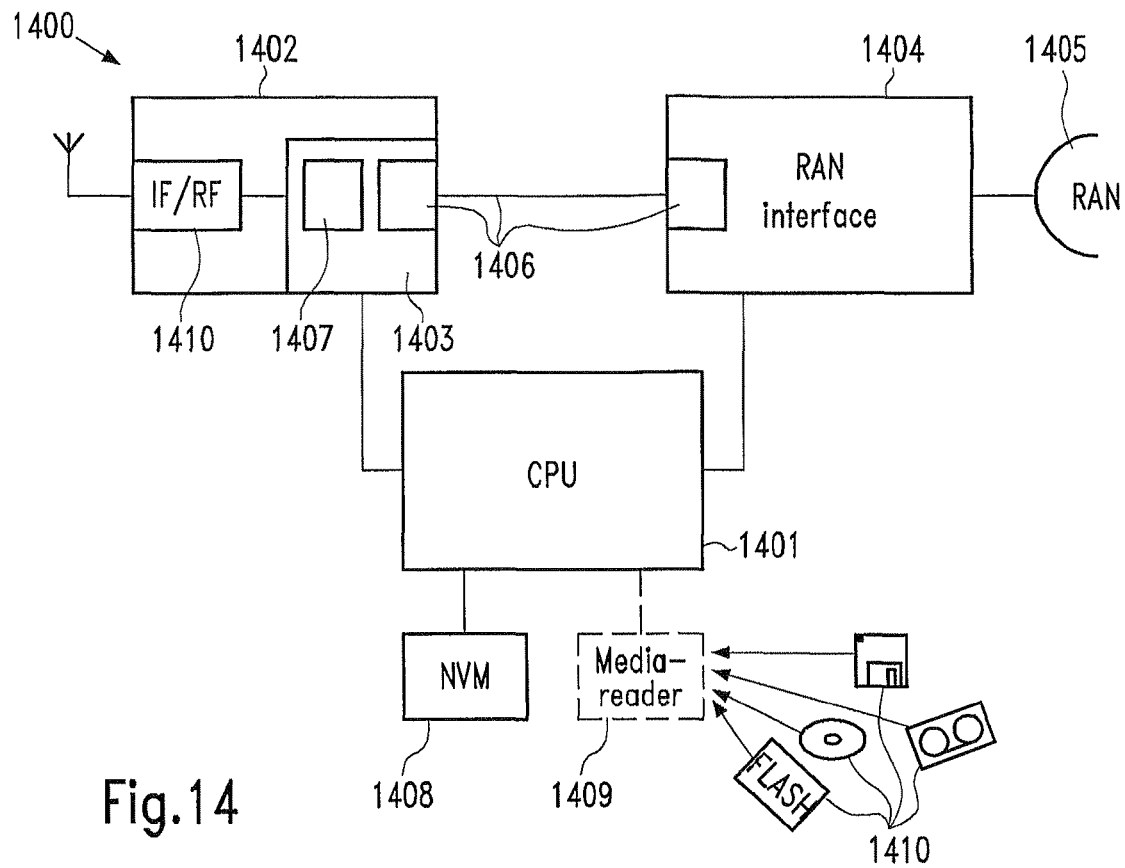
FIG. 14 shows an exemplary structure of an access point.

FIG. 14 shows an example for a structure of an access point 1400 in which the described method can be applied. The access point comprises a central processing unit 1401 which controls the functions of the other components. The access point further comprises WLAN communication means 1402 which is adapted to provide a connection to a mobile station via the wireless local area network. While the radio frequency and intermediate frequency part 1410 might be located in other entities, WLAN communication means 1402 comprised in access point 1400 at least comprises protocol execution means 1403. Access point 1400 further comprises a radio area network interface 1404 which can provide wireless connection to a mobile phone via a radio access network. The interface can be connected directly to a base station controller or via a core network or an aggregation network to a radio access domain.

WLAN protocol execution means 1403 may be implemented in hardware, in software executed in a dedicated processor of the WLAN communication means 1402 or in software in CPU 1401. It comprises means 1406 for obtaining the information necessary for synchronization from the RAN via the RAN interface and synchronisation means 1407 for synchronising the WLAN radio channel reservation periods to the RAN TTIs as described in detail above. Information transfer means 1406 is depicted in FIG. 14 as separate connection for the sake of illustration, but the information may also be transferred through CPU 1401 or within the CPU from one software process to another. Alternatively information transfer means 1406 may comprise a receiver for receiving RAN radio signals and means for obtaining synchronisation information from the radio signals. WLAN protocol execution means 1403 further comprises synchronising means 1407 adapted to perform the method which is described in detail above.

Program instructions which cause CPU 1401 to perform the method according to the invention can be stored in non-volatile memory 1408. NVM 1408 may be any non-volatile data storage medium like semiconductor flash memory or a magnetic hard disk drive. AP 1400 may further comprise a media reader 1409 for reading computer-readable media 1410 like magnetic discs or magnetic tape, optical or magneto-optical discs like CD or DVD, or semiconductor storage cards like flash cards, SD cards and the like. From such media, computer-executable code, which causes the CPU or other processors to perform the method according to the present invention, may be read. This may be done for example for initial program loading or for program update.

Figure 15:
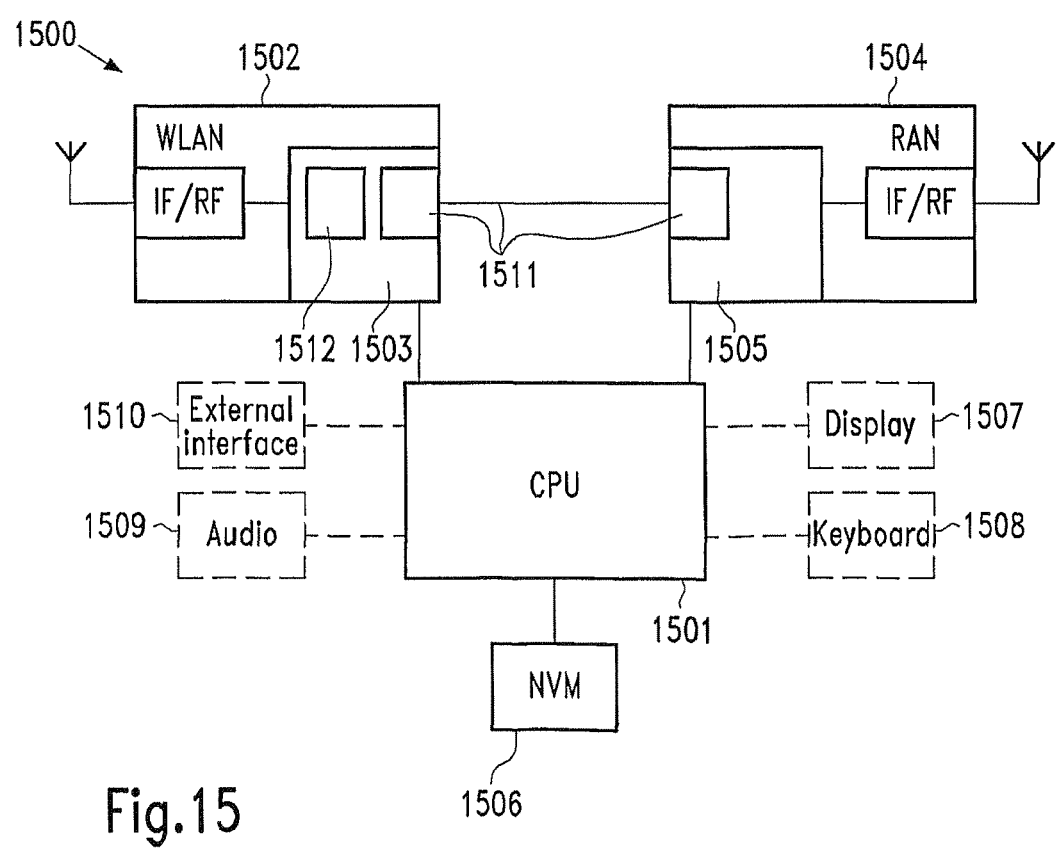
FIG. 15 shows an exemplary structure of a mobile station.

A mobile phone or mobile station on which the method according to the present invention can be performed is shown in FIG. 15. It comprises a central processing unit 1501, WLAN communication means 1502 with protocol execution means 1503 and RAN communication means 1504 with protocol execution means 1505. Also here, protocol execution means 1503 and 1505 may be embodied in logic circuitry, in software on dedicated processors or in software on CPU 1501. The mobile phone 1500 may further optionally comprise a non-volatile memory 1506 and standard peripheral components like display 1507, keyboard 1508, audio interface 1509 or external interface 1510 or other components which are not shown in FIG. 15. The external interface 1510 may be used to download, for initialization or update purpose, software which causes the mobile phone to perform the method according to the present invention.

Mobile station 1500 may as well be an accessory module for portable computers or a functional entity within any apparatus, like a vending machine, a vehicle or even a personal area network consisting of a plurality of devices which are coupled wirelessly or by connection cables.

WLAN protocol execution means 1503 may be implemented in a dedicated processor of the WLAN communication means 1502 or in software in CPU 1501. It comprises means 1511 for obtaining the information necessary for synchronization from the RAN from the RAN communication means 1504. Information transfer means 1511 is depicted in FIG. 15 as separate connection for the sake of illustration, but the information may also be transferred through CPU 1501 or within the CPU from one software process to another. WLAN protocol execution means 1503 further comprises synchronising means 1512 adapted to synchronise the WLAN radio channel reservation periods to the RAN TTIs as described in detail above.

Program instructions which cause CPU 1501 to perform the method according to the invention can be stored in non-volatile memory 1506. Further, software which causes the CPU or other processors to perform the method according to the present invention may be downloaded via an external media reader from computer-readable media like magnetic discs or magnetic tape, optical or magneto-optical discs like CD or DVD, or semiconductor storage cards like flash cards, SD cards and the like. This may be done for example for initial program loading or for program update.

The invention claimed is:

1. A method for synchronizing in a heterogeneous mobile network, for the purpose of interoperability, a wireless local area network to a radio access network, the method comprising:

transmitting information from a protocol executing entity of the radio access network, which transmits data in transmission time intervals of pre-defined duration, to a protocol executing entity of the wireless local area network, in which a medium is reserved for a certain service or user in radio channel reservation periods of variable duration, about a duration and a time alignment of the transmission time intervals;

defining the variable duration of a radio channel reservation period such that it ends by a pre-defined time period before the end of a transmission time interval of the radio access network; and reserving the medium of the wireless local area network for the service or user, respectively, during the radio channel reservation period so that the wireless local area network is synchronized to the radio access network.

2. The method according to claim 1, wherein the variable duration indicating the duration of the radio channel reservation period is defined using the formula $$t_n + \text{Duration} + \text{IFS} = n \times \text{RAN\_TTI}$$

wherein $t_n$ is the time difference between start of the radio channel reservation period and start of the current transmission time interval, IFS is the pre-defined time period and RAN_TTI is the pre-defined duration of the transmission time interval.

3. The method according to claim 1, wherein a multi radio access scheduling interval is defined having a duration of an integer multiple of the transmission time interval duration and starting at the beginning of a transmission time interval, the multi radio access scheduling interval being a time unit for which data is scheduled to be transmitted either on said wireless local area network or on said radio access network, wherein the variable duration of the radio channel reservation period is defined such that it ends by a pre-defined time period before the end of said multi radio access scheduling interval.

4. The method of claim 3, further comprising:
defining a preliminary duration for a current radio channel reservation period;
defining a time distance limit; and
re-calculating the duration of the current radio channel reservation period as defined in claim 3 if it is decided that the current radio channel reservation period will end with the preliminary duration in a time window defined by the time distance limit around the end of the current multi radio access scheduling interval.

5. The method according to claim 1, further comprising sending a primitive from a station management entity to a media access control management entity, comprising information about whether a synchronization with another radio access network is requested.

6. The method according to claim 1, further comprising sending a primitive from the station management entity to the media access control management entity, comprising information about a type of radio access network with which synchronization is requested, the duration of the transmission time intervals and/or a start time of a transmission time interval.

7. The method according to claim 1, wherein the wireless local area network complies with standard IEEE 802.11 g.

8. The method according to claim 1, wherein the wireless local network complies with standard IEEE 802.11 g and standard IEEE 802.21 and the method further comprises sending, upon reception of a message from a mobile station notifying a change of the quality of an associated link, a primitive from a protocol layer managing media independent handover to a protocol layer of the wireless local area network controlling media access, the primitive comprising information whether to activate or to deactivate the method according to claim 1.

9. The method according to claim 1, wherein the wireless local network complies with standard IEEE 802.11 g and standard IEEE 80121, and the method further comprises:
sending, upon reception of a message from a mobile station notifying a change of the quality of an associated link, a primitive from a protocol layer managing media independent handover to a protocol layer of the wireless local area network controlling media access, the primitive comprising information whether to activate or to deactivate the method according to claim 1, and
sending, upon reception of a message from a mobile station that a link in the radio access network is not finally going down, a primitive from a protocol layer managing media independent handover to a protocol layer of the wireless local area network controlling media access, the primitive comprising information to request deactivation of the method according to claim 1.

10. The method according to one claim 1 wherein the radio access network complies with the Universal Mobile Telecommunications System (UMTS) standard.

11. The method according to claim 1 wherein the radio access network complies with the High Speed Downlink Packet Access (HSDPA) standard.

12. A non-transitory computer-readable storage medium having stored thereon instructions which, when executed on a processor of an access point of a wireless communication network or on a processor of a mobile station, cause the access point or mobile station to perform the method according to claim 1.

13. An apparatus forming an access point of a heterogeneous wireless communication network, comprising:
a wireless local area network communication unit adapted to provide connection to a mobile station via a wireless local area network, which is adapted to reserve a medium for a certain service or user in radio channel reservation periods of variable duration;
a radio access network interface for providing connection to said mobile station via a radio access network, wherein the radio access network transmits data in transmission time intervals of pre-defined duration;
an information transfer unit configured to receive information from said radio access network about a duration and a time alignment of the transmission time intervals; and
a synchronizing unit configured to control the wireless local area network communication unit such that the variable duration of a radio channel reservation period ends by a pre-defined time period before the end of a transmission time interval.

14. The apparatus of claim 13, wherein said synchronizing unit comprises unit for defining the variable Duration indicating the duration of the radio channel reservation period using the formula $$t_n + \text{Duration} + \text{IFS} = n \times \text{RAN\_TTI}$$

wherein $t_n$ is the time difference between start of the radio access scheduling period and start of the current transmission time interval, IFS is the pre-defined time period and RAN_TTI is the pre-defined duration of the transmission time interval.

15. The apparatus of claim 13, further configured to be operated in a radio access network in which a multi radio access scheduling interval is defined having a duration of a multiple of the transmission time interval duration and starting at the beginning of a transmission time interval, wherein the synchronizing unit is further configured to control the variable duration of the radio channel reservation period such that it ends by a pre-defined time period before the end of said multi radio access scheduling interval.

16. The apparatus of claim 15, wherein said synchronizing unit further comprises a deciding unit for defining a preliminary duration for a current radio channel reservation period, for defining a time distance limit, and for deciding whether or not the current radio channel reservation period will end with the preliminary duration in a time window defined by the time distance limit around the end of the current multi radio access scheduling interval; wherein the deciding unit is further configured to control said synchronizing unit to re-calculate the duration of the current radio channel reservation period as defined in claim 15 if it is decided that the current radio access scheduling period will end with the preliminary duration in the time window.

17. An apparatus forming a mobile station for a heterogeneous wireless communication network, comprising:
- a wireless local area network communication unit adapted to provide connection to a heterogeneous wireless communication network via a wireless local area network, which is adapted to reserve a medium for a certain service or user in radio channel reservation periods of variable duration;
- a radio access network connection unit adapted to provide connection to said heterogeneous wireless communication network via a radio access network, wherein the radio access network transmits data in transmission time intervals of pre-defined duration;
- an information transfer unit configured to transfer, from said radio access network connection unit to said wireless local area network communication unit, information about a duration and a time alignment of the transmission time intervals; and
- a synchronizing unit configured to control the wireless local area network communication unit such that the variable duration of a radio channel reservation period ends by a pre-defined time period before the end of a transmission time interval.

* * * * *